Dec. 7, 1971   J. S. ALVERO   3,625,724
CELLULAR CONCRETE AND METHOD FOR PRODUCING THE SAME
Filed Sept. 23, 1968   5 Sheets-Sheet 2

INVENTOR
JESUS S. ALVERO

BY
Oberlin, Maky, Donnelly & Renner
ATTORNEYS

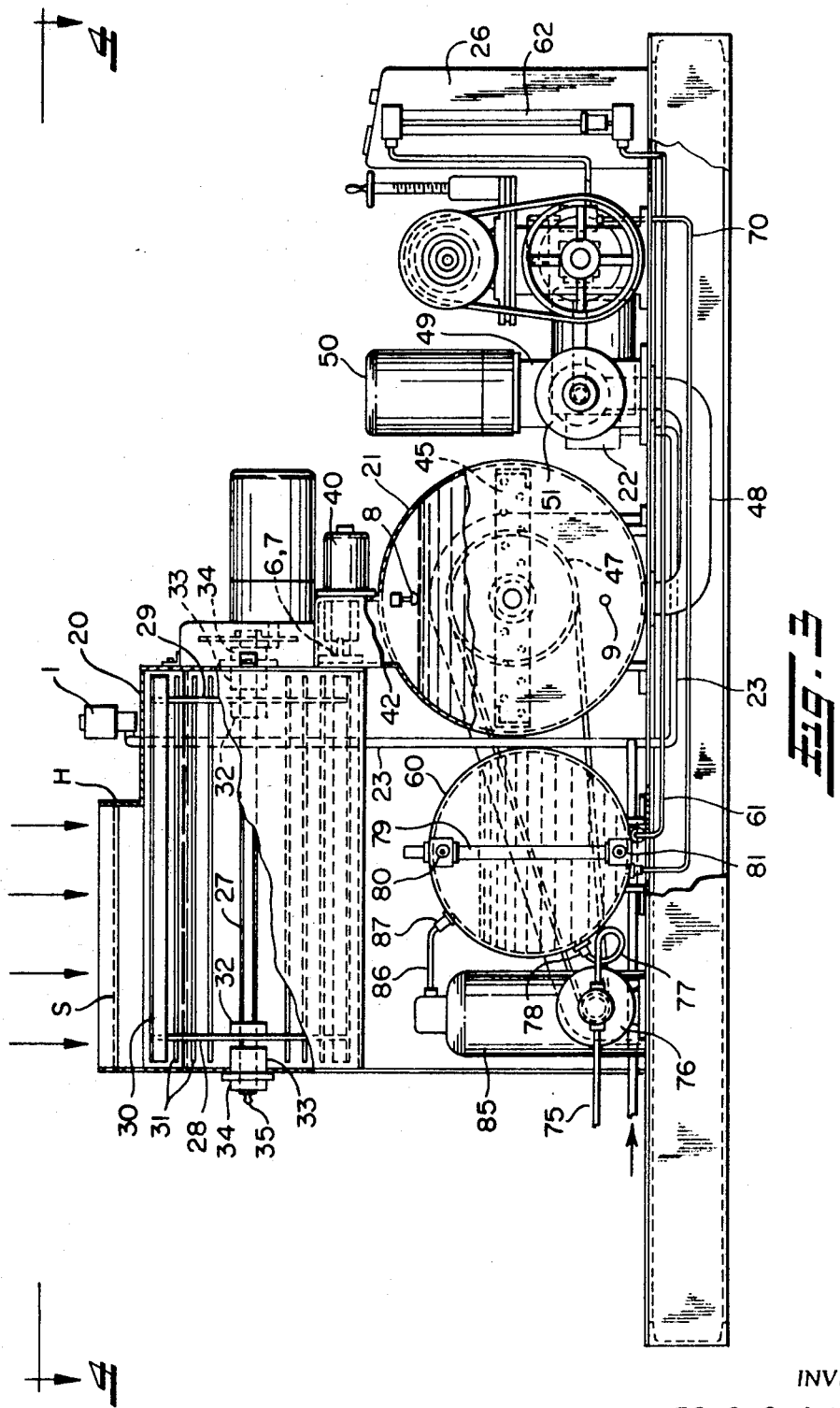

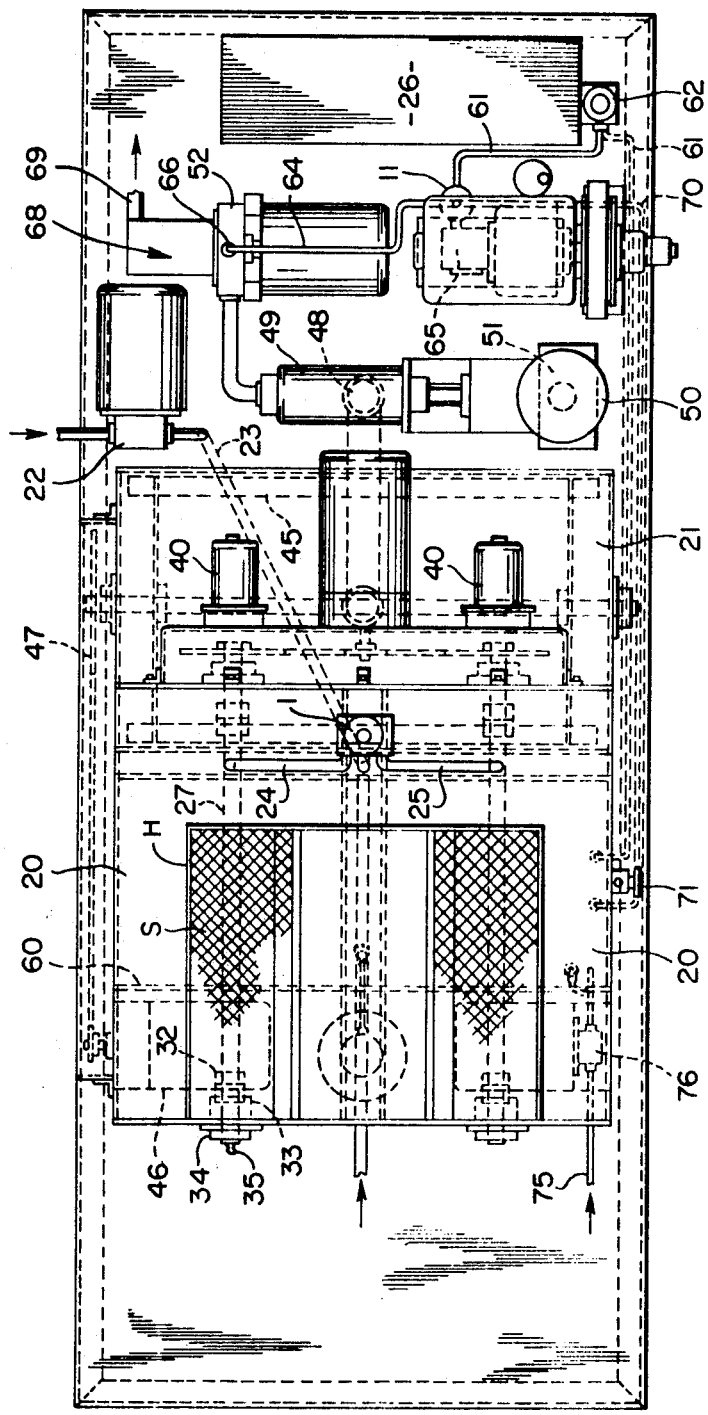

United States Patent Office 3,625,724
Patented Dec. 7, 1971

3,625,724
CELLULAR CONCRETE AND METHOD FOR PRODUCING THE SAME
Jesus S. Alvero, Quezon City, Republic of the Philippines, assignor to Altrona Corporation, Paco Manila, Republic of the Philippines
Filed Sept. 23, 1968, Ser. No. 761,551
Int. Cl. C04b *13/124, 21/02*
U.S. Cl. 106—87                                 24 Claims

ABSTRACT OF THE DISCLOSURE

Cellular concrete, and a method and apparatus for producing the same in which a multitude of substantially closed cells are produced. During production of the concrete, the cells have a substantially impervious coating or "shell" thereon to permit hardening of the concrete to occur without interference from the production and expansion of the cells.

This invention relates generally as indicated to a cellular concrete and to a method and apparatus for producing the same, and more particularly relates to such a product which has a multitude of substantially completely closed cells distributed throughout.

Cementitious materials have, of course, been used as construction materials for centuries, originating in the construction of shelters from stones and boulders with the use of clay and mud as binders. Through the centuries, shelters continued to be constructed from the same basic materials, but more effective binding materials were discovered, viz, lime and "natural cement." As the requirements for the construction of such shelters became more complex, it thus became necessary to compensate for the effects of tension as well as compression by the use of "reinforcing materials." For example, there is evidence that even in rather ancient Biblical times, bricks of mud and clay were reinforced with straw.

The use of a combination of such materials to take care of the various stress characteristics did not develop extensively, however, until materials with good tensile characteristics and resistance to rotting were discovered. The development of steel and its use in combination with the usual construction materials which were effective for compressive stresses unquestionably revolutionized the concept of design since steel had the desired quality of permanence in combination with the aggregate materials. Reinforced concrete which is so widely used today has thus evolved from the stone and binder construction with natural fiber reinforcements of ancient history, with the steel taking care of the tensile stress in structural members and the cement, binder and aggregates taking care of the compressive stresses.

In reinforced concrete design today, four types of stresses must be considered, viz, compression, tension, shear and bond, to provide a structurally sound material. The designer must not only attempt to balance his design to meet the various stresses, however, but he must also provide the most economical proportion of ingredients to achieve the working stresses of the structural members and to meet special restrictions as to the size of the beams and girders which may be due to either asethetic or functional requirements. From the vantage point of both economy and efficiency, it is thus desirable to use as little material as possible to achieve adequate strength in the structural members to support the working load and at the same time to protect the structure from the normal stresses of nature such as weather, moisture and temperature changes. In addition to these considerations, the designer must also consider the variations of loading of the structure, depending upon its intended use and upon the extreme temperature and stress changes which must be resisted in case of fire, severe storm or earthquakes.

Since as early as about the beginning of the 15th century, designers have been attempting to solve the weight and stress problems by hollow construction materials, but such efforts did not meet with significant success. At the beginning of the 19th centrury, new approaches were tried, and for the first time cellular concrete became the goal. In the United States, cinders and slag of the steel industries were used as aggregates in lieu of sand and gravel in order to reduce the total weight of understessed members. In Italy, volcanic ash and porous stones were used to reduce the weight of the cement mix, and in Germany, vermiculite (a special expanded mica) was used as the aggregate to achieve weight reduction. Other efforts to resolve the weight problem of construction included the use of organic fillers as aggregates, such as sugar cane bagasse, sawdust, etc. Most of these failed in time, however, due to the action of the alkali in the cement on the organic fillers or due to the action of termites, bacteria and moisture.

"High rise" constructions, such as office and apartment buildings, necessitate the continuing search for construction materials in which adequate stress resistance distribution and reduced weight can be obtained. It is accordingly a principal object of the present invention to provide a cellular concrete in which such combination of properties is attained.

Another object of this invention is the provision of a cellular concrete in which the cells are of a substantially closed configuration to provide an extremely strong product which is substantially imprevious to the passage of fluids.

A further object of this invention is the provision of a cellular concrete and a method and apparatus for producing the same in a relatively inexpensive and expedient manner.

Still another object is the provision of a cellular concrete in which the density can be varied over a wide range, whereby a product of variable weight and strength can be produced to fit the requirements of a particular need.

A further object of this invention is the provision of a cellular concrete of exceptional structural strength capable of possessing a live load to dead load ratio of as much as 4:1 and which at the same time is extremely lightweight and capable of floating in water in about 75 percent of its density range.

A further object of this invention is the provision of a cellular concrete which has excellent resistance to the effects of heat and moisture and which may be used as an insulating material.

Still another object is the provision of a cellular concrete which is suitable for use in the production of precast forms.

It is a further object of this invention to provide a surfacing material for roads which maintains a constant coefficient of friction throughout its life or as it wears.

A further object of this invention is the provision of an apparatus and process which can be readily and easily controlled to vary the cell size and thickness of the cell walls or the intervening web structure of the resulting product.

Other objects, features and advantages of this invention will become apparent to those skilled in the art after a reading of the following more detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 3 is a longitudinal section of the apparatus taken on line 3—3 of FIG. 2;

FIG. 4 is a plan view of the apparatus taken on line 4—4 of FIG. 3;

Figure 1:
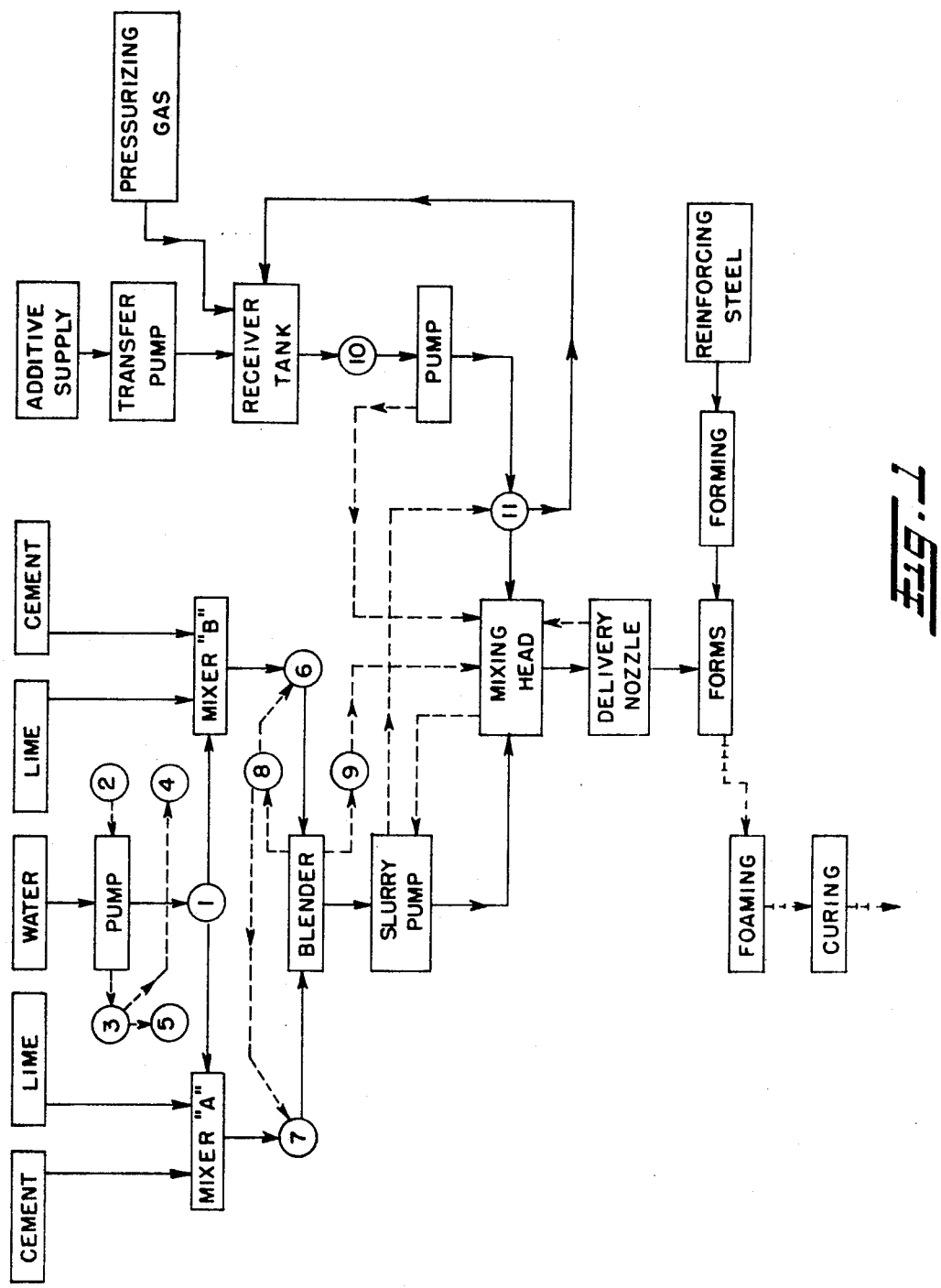
FIG. 1 is a flow sheet illustrating schematically the process of this invention.

Referring now more particularly to the flow sheet of FIG. 1, a preferred mode of operation of the process and apparatus of the present invention is illustrated. The process in general comprises the introduction of a gas producing additive into a body of fluid, hardenable cementitious material, permitting the additive to foam to produce a multitude of cells in the cementitious material, forming a substantially impervious coating on the cell surfaces (as will be described hereinafter), and subsequently solidifying the cementitious material to produce the desired cellular concrete product.

As illustrated in FIG. 1, a dual mixing operation of the cementitious material is preferably used. A water slurry of such material is produced in each of mixers A and B, the water being pumped into the appropriate mixer through a three-way solenoid valve designated by numeral 1. The cementitious material, which will ordinarily be portland cement or an admixture of portland cement and a relatively small quantity of lime, will likewise be transported to mixers A and B. The filling of the mixing tanks is controlled by a water pump timer 2 and a mixer timer 3, located at a control panel (not shown in FIG. 1) which regulate the quantity of water and cementitious material respectively being introduced into the mixing tanks. Flashers 4 and 5 are also provided for the two mixing tanks to indicate visually when the particular tank is in use.

In the operation of the apparatus and process, after the water slurry of cementitious material in a particular mixer has been mixed sufficiently, the slurry will be transferred through gate valve 6 or 7 to a blender where it will be further processed to produce a substantially uniform distribution of the cementitious material in the water. The blender has top and bottom sensing devices 8 and 9 which serve to indicate the level of the slurry within the blender which in turn indicates to the operator whether additional material should be introduced into the blender and when it is safe to withdraw material from the same.

From the blender, the cementitious slurry is pumped to a mixing head where it will be admixed with the gas producing additive. The additive is itself pumped from a source of supply to a receiver tank which is maintained under pressure by a pressurizing gas. From the receiver tank, the additive is passed through a flow meter 10 which regulates the quantity of additive to be introduced into the mixing head. The additive is pumped to the mixing head through a three-way solenoid valve 11. In the chamber of the mixing head, the additive and cementitious slurry are admixed to distribute evenly the additive which is thus broken into small particles or droplets. After appropriate mixing within the mixing head, the admixture of cementitious slurry and gas producing additive is carried, preferably by a plastic hose, to a delivery nozzle through which it is deposited into the forms. The concrete will, of course, remain in the forms until curing or setting is complete.

Figure 2:
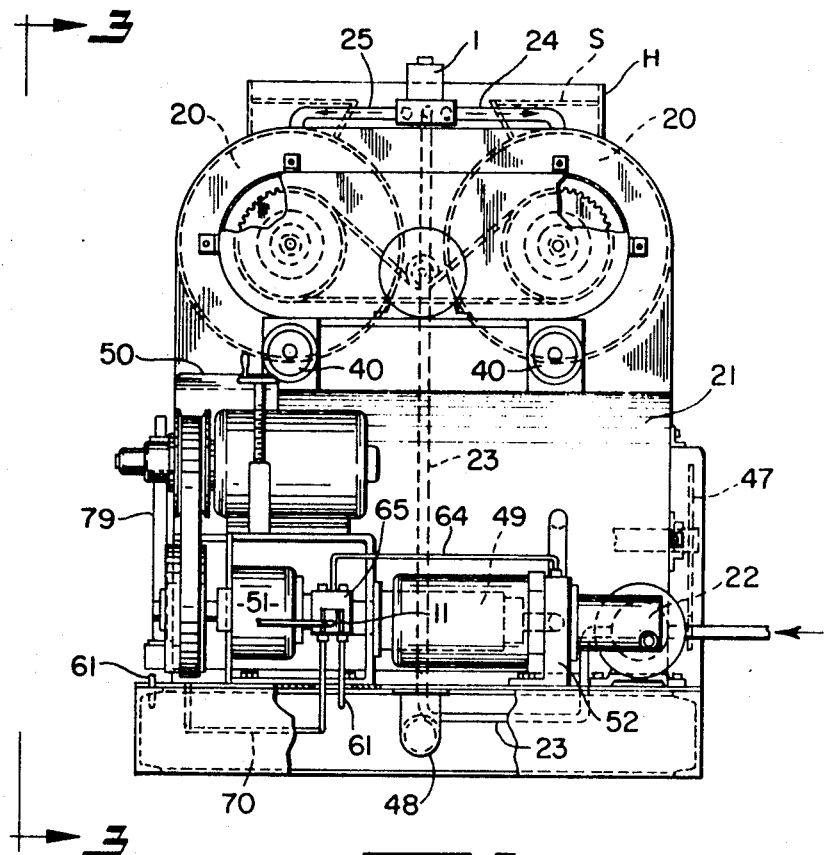
FIG. 2 is a front elevation view of the apparatus of this invention with the control panel removed for clarity of illustration.

Referring now to FIGS. 2–4 of the drawing, a preferred system of apparatus is illustrated. The apparatus thus includes two mixing drums 20 in which the cementitious material and water are introduced through hopper H and screen S and the slurries of cementitious material and water are prepared and fed alternately to a blender 21. The quantity of water which will be added to the mixing drums is determined by the quantity of cementitious material which is to be used and will be supplied to the mixing tanks by water pump 22 through line 23, three-way solenoid valve 1, and branch lines 24 and 25. The water pump is controlled by a timer at the control panel 26 which, by a time-lapse arrangement, is programmed to deliver the proper quantity of water to the mixing drum in cycle. When the water delivery is approximately half completed, loading of the cementitious material into the mixing drum 20 is begun. Preferably, an audio signalling device is positioned at control panel 26 to indicate when the loading begins.

Each of the mixing drums 20 is equipped with a rotating shaft 27 having radial arms 28 and 29 which hold scrapers 30 and beater rods 31 which are fixed to the shafts by means of trunnions 32 and trunnion bolts. The shaft is also provided with water repellent plastic glands 33 at both ends along with end bearings 34. The glands are lubricated through grease fittings 35 at the ends of the shaft and through grease ducts (not shown) which are drilled into the shaft. It will, of course, be appreciated that other agitation means within the mixing drums can be used such as radially disposed blades on shaft 27 and cooperating fixed projections mounted within the drums.

At the end of the mixing time, which is preset by a timer 3 at control panel 26, the appropriate flasher 4 or 5 will flash, thus indicating the end of the mixing cycle and the readiness of the slurry within the particular tank for the delivery cycle. The beaters within the mixing drums continue their rotation while the slurry is waiting for delivery to the blender. To discharge the slurry from the mixing drum into the blenders, a switch at the control panel 26 is manually thrown to the open position which activates the solenoid at the pneumatic valve assembly 40, thus closing the pressurized line leading to the assembly and releasing the pressure at the valve cylinder thus opening delivery port 6 or 7 through which the slurry in the mixing drum escapes through line 42 into blender tank 21. When the level of the slurry within the blender tank reaches the top sensing device 8, a signal flashes between the delivery switches of the pneumatic valve 40 and delivery to the blender is interrupted to prevent overflowing of the slurry. In the meantime, the other mixing drum is in the load position and the water delivery is started by the operator pushing the appropriate button on the control panel to begin the cycle. The water delivery cannot be started if the mixing drum pneumatic valve is in the open position.

In blender 21, the slurry is kept in constant mixing action by beater 45 which is driven through motor 46 and sprocket drive 47. The slurry is removed from the blender tank through line 48 by slurry pump 49 which is driven by electric motor 50 through reduction gear 51. The slurry is transported to the mixing head block 52 under pressure.

The gas producing additive is maintained in tank 60 under pressure, as for example, by a gas such as butane, propane, Freon or nitrogen, and is transferred from tank 60 through feed line 61, flow meter 62, solenoid valve 63 and output line 64 to the mixing head block 52 by pump 65. The additive is introduced into the mixing head block 52 through check valve nozzle 66, being introduced into a beater 67 (FIG. 5) within the mixing head which in its rotation distributes the additive into the slurry stream in the mixing chamber 68 and thus prevents entry of the abrasive slurry between the shaft and bushing. The rotating delivery also evenly distributes the additive within the slurry and breaks the additive into small particles or droplets. The slurry-additive admixture leaves the mixing chamber through delivery port 69 and is carried, preferably by a plastic hose, to a delivery nozzle by which it is deposited into the forms.

In the operation of the blender tank, when the level of cementitous slurry falls below a safe level, cavitation could take place at the blender outlet port, and this is prevented by the lower sensing device 9 which signals the nozzle operator to stop delivery to the molds. When this occurs, the mixing head and slurry pump operation are stopped and solenoid valve 63 is switched to the circulate position, and the pumped additive is bypassed to tank 60 through return pipes 70 and check valve 71, and simultaneously pressurizing gas is applied at the mixing head chamber 68 and pushes the mixed slurry and additive in the plastic hose to the delivery nozzle.

The electrical circuitry which may be used to accomplish the aforedescribed operations may be any such circuitry and components which are commercially available and the selection of particular such circuitry and components will be readily understood and achieved by those skilled in such art. No further description of this is necessary, therefore, and for the sake of brevity will not be set forth.

When the quantity of additive in the tank 60 reaches a low level, it may be refilled through inlet line 75 by transfer pump 76 through refilling line 77 and check valve 78. The tank is also provided with a sight glass 79 so that the level of the additive within the tank may be observed visually. The sight glass is provided with stopcocks 80 and 81 at the top and bottom, which are closed during transit to prevent spilling of the additive if the sight glass is broken. The additive tank 60 may also be refilled without interrupting operation since it is pressurized by a gas in tank 85 which enters the tank 60 through line 86 and check valve 87. The tank 60 is also preferably provided with a safety valve which limits the pressure that can be built up during the refilling operations.

Figure 5:
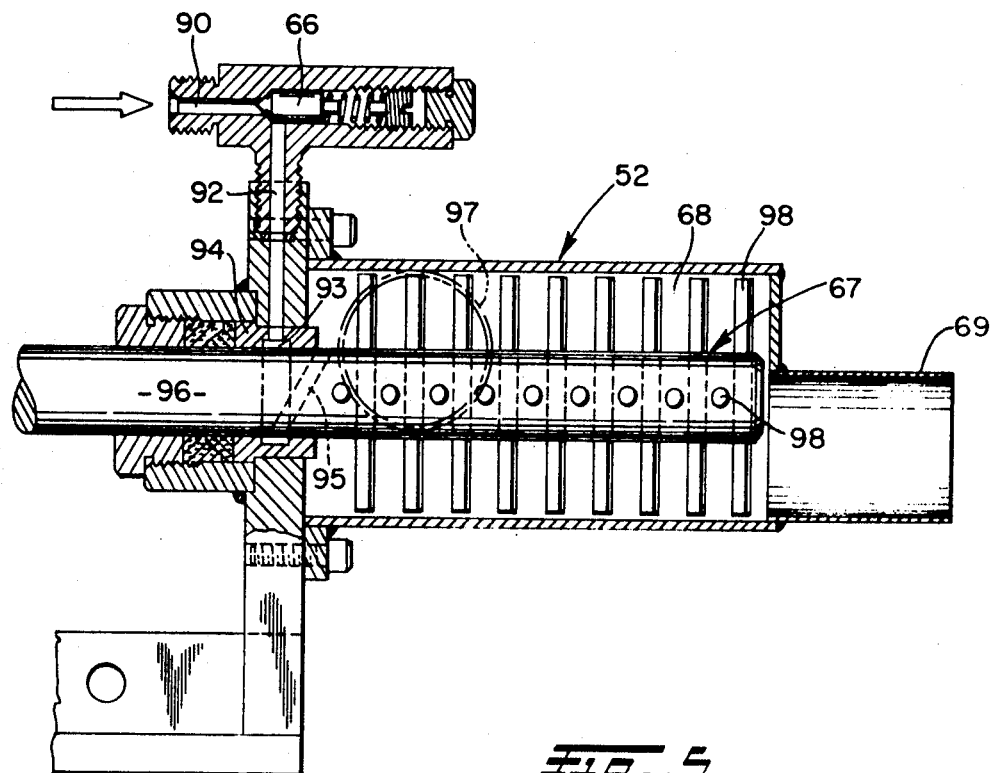
FIG. 5 is a fragmentary, partial section view of one form of mixing head used in this invention.

In FIG. 5, a preferred form of mixing head 52 is shown in detail. The gas producing additive is introduced through opening 90 against valve 66, through line 92 and groove 93 in bushing 94 and into drill hole 95 in the shaft 96 of the beater 67 from which it is injected into mixing chamber 68 and admixed with the slurry of cementitous material which is admitted to the chamber through opening 97. The beater has a plurality of radially disposed blades 98 along shaft 96 which admix the additive with the slurry and propel the admixture through the chamber and discharge port 69. The actual time required for admixing and passage through the chamber and discharge port is extremely short, being on the order of only about 1/60 of a second, as it has been found that significantly longer mixing produces cells of such minute size that the finished concrete will not have the desired characteristics.

Figures 6, 7:
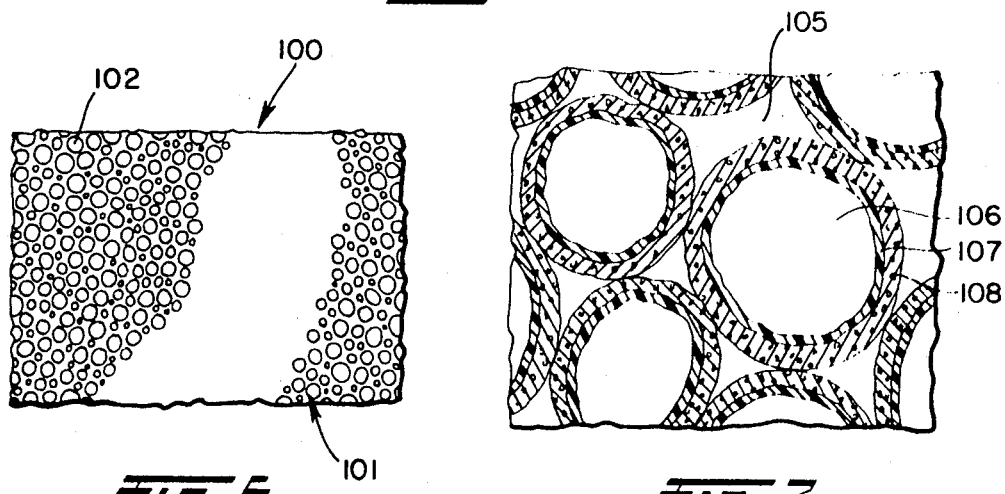
FIG. 6 is a fragmentary enlarged view showing the structure of the cellular concrete of this invention.
FIG. 7 is a fragmentary semi-diagrammatic view of an enlarged section of the cellular concrete showing in detail the cell structure prior to complete setting.

In FIG. 6, a fragmentary enlarged view of the cellular concrete of this invention is illustrated. The concrete structure is indicated generally by the numeral 100 and comprises an intervening or connecting structure 101 of cementitous material and a multitude of substantially completely closed cells 102 distributed throughout the structure. As can be observed, the cells are of a closed nature, that is adjacent cells do not interconnect so as to form interconnecting voids. It is thus structure which contributes to the provision of a concrete product having the necessary structural strength and yet being extremely light in weight and impervious to the passage of fluids.

In the process of this invention, when the gas producing additive is admixed with the water slurry of cementitous material, the small droplets of additive are distributed evenly throughout the slurry stream without being actually blended with it. This is achieved by incorporating an inhibitor or stabilizer in the chemical additive which causes the droplets, when in contact with water, to develop a repulsion to other droplets by initially attracting a fine water film about them. The cement slurry adjacent the droplets of additive will harden and thus encase the droplets within a film of the hardened slurry. By adjusting the size of the droplets and the dispersal density, the proper spherical closed cells are formed uniformly from the top to the bottom of the mass within the forms. The droplets of additive with the partly hardened shell of cementitous material automatically space themselves in the mass, prevent combination with adjacent cells to form bigger cells and also stay in their respective positions until the setting of the mass is completed.

During the foaming and setting steps of the process, two independent groups of physical changes and chemical reactions take place, viz, the blowing of uniform size and spaced bubbles and the setting of the cementitous mass, and each such change and reaction is kept from interfering with the other. The composition of the gas producing additive is thus extremely important to the success of this invention and includes, as an ingredient, a blowing agent which will produce cells within the cementitous slurry and a material which will form a film about the cells to prevent the cells from uniting with other cells to form larger cells. The additive also contains an accelerator which accelerates the formation of a hardened shell of set cementitous slurry around the tiny gas cells while the remainder of the cementitous slurry sets in the conventional manner. The additive thus undergoes a physical change from a liquid to a solid and gas while the slurry changes from semisolid to solid. The chemical reaction involved is the setting reaction of the cementitous material or hydration, depending upon the particular cementitous material used.

The structure of the cellular product discussed above prior to complete setting is illustrated semi-diagrammatically in FIG. 7 of the drawings. The slurry of cementitous material is designated generally by numeral 105 and contains gas cells 106. Immediately surrounding the cells is a coating or film of film-forming material 107, and the coated gas cell is encased in a shell of prehardened cementitous material 108. As setting of the cementitous material continues, the physical changes noted above occur and when setting is complete, the gas and film will have diffused through the concrete to form the cellular concrete illustrated in FIG. 6.

The density of the cellular concrete is, of course, inversely proportional to the amount of additive which is admixed with the cementitous mass, and the compressive stress resistance is directly proportional to the density. The density of the concrete product can be varied over a wide range, with the generally useful commercial range being from about 30 lbs./cu. ft. to about 75 lbs./cu. ft. The compressive stress range may vary between about 300 to about 2000 p.s.i. The coefficient of conductivity varies between about 0.08 to about 0.12 B.t.u./ft.$^2$/ft./ H/°F., and the temperature range within which the concrete may be satisfactorily used is between —40° F. to over 3500° F. The thermal shock resistance is 3500 °F. rise in one second.

The cementitous material which will be used in the present invention is a water settable cementitious material such as portland cement, lime, plaster, or mixtures of such materials. Other materials such as fire clay, asbestos clay, kaolin, and mixtures thereof may also be mixed with the cementitious material. In general, portland cement or portland cement and small quantities of lime are the preferred such materials.

The gas producing additive which is used in the present invention comprises from approximately 20 to about 70 volume percent of a water insoluble, oil miscible liquid blowing agent which has a relatively low boiling point (it will boil at ambient temperature and pressure), approximately 4 to about 16 volume percent of a water insoluble, oil miscible film-forming agent and approximately 20 to about 50 volume percent of an oleaginous carrier liquid. The blowing agent and the film-forming agent should be incapable of saponifying with the alkali content of the cementitious material, and the oleaginous carrier liquid will likewise preferably be incapable of saponifying with such content. The film-forming agent must also be soluble in the blowing agent. By describing the liquid blowing agent and film-forming agent as "oil miscible," it is, of course, intended that such agents are to be miscible with the oleaginous carrier liquid.

The additive will also preferably include approximately 3 to about 10 volume percent of an accelerator which is incapable of saponifying with the alkali content of the cementitious material. The additive may also include from about 2 to about 8 volume percent of an oil soluble stabilizer.

As noted above, the blowing agent must be a water insoluble, oil miscible liquid. Many materials are suitable for this purpose, including liquefied butane, liquefied propane, 1,3 butadiene, 1,3 dibromo, 2,2-dimethyl propane, 3 methyl glycol diphenyl ether alpha-butylene, 1,2 butadiene, methylallene, 1-butyne, ethyl acetylene and various Freons, such as Freon 11, Freon 12 and Freon 22.

The oleaginous carrier liquid is preferably a diesel oil such as a No. 2 automotive oil, which has a medium viscosity of, for example, within the range of from about 10 to about 20 SAE number. The carrier liquid should also be water insoluble and miscible with the other ingredients of the additive. In addition to diesel oil, other oleaginous materials may be used, such as castor oil, mineral oil, vegetable oil, cocoanut oil, other organic oils and blends of such oils.

There are also many materials which are suitable for use as the film-forming agent, so long as they are soluble in the blowing agent and capable of solidifying when the blowing agent vaporizes and leaves the solution. The preferred such material is paraffin or linseed oil, but organic waxes, such as beeswax, carnauba wax and synthetic waxes may be used. Certain urethanes may also be used, as well as any of the film-forming plastics which are miscible with the other ingredients of the additive.

The accelerator should also be incapable of saponifying with the alkali content of the cementitious material and capable of accelerating setting of the cementitious material locally around the cells. For this purpose, it has been found that carbon tetrachloride is highly satisfactory, but other similar materials such as trichloroethylene, chlorofluoro compounds, and sodium silicate may also be used if desired.

The stabilizer may be an oil soluble silicone (either long or short chain) or other such material which is soluble in glycol or oil. The stabilizer will serve to make the additive water-repellent and prevent the droplets of additive from combining with the water and the cementitous slurry.

The broad general range of proportions of the ingredients of the additive are as stated above, viz, about 20 to about 70 volume percent of the liquid blowing agent, about 20 to about 50 volume percent of the oleaginous carrier liquid, about 4 to about 16 volume percent of the film-forming agent, about 3 to about 10 percent of the accelerator, and from about 2 to about 8 percent of the stabilizer. The preferred ranges of such ingredients are about 30 to about 50 volume percent of the liquid blowing agent, about 40 volume percent of the carrier liquid, about 12 volume percent of the film-forming agent, approximately 5 volume percent of the accelerator, and approximately 4 volume percent of the stabilizer.

To prepare the additive, the film-forming agent is melted and admixed with the carrier liquid. The admixture is then cooled, and the oil soluble stabilizer is then added thereto. The accelerator is subsequently added to the mix, and the liquid blowing agent is subsequently added under pressure of, for example, from about 65 to about 95 lbs./sq. in. The mixing tank is equipped with agitation means and the mix is agitated to produce a stable mix which is a nearly saturated solution.

After the gas producing additive is introduced into the slurry of the cementitious material, the blowing agent will boil and vaporize and evaporate to produce a multitude of air cells throughout the slurry. When this occurs, the temperature of the slurry will drop, and the film-forming agent will solidify and form a thin film about the gas cells. The film-forming agent will, of course, have the stabilizer, the carrier liquid and the accelerator incorporated therein. The accelerator, which is preferably carbon tetrachloride, will react with the alkali in the cement and with the water to accelerate the local hardening of the cement around the bubbles or cells and thus preclude collapse and combining of cells during setting of the cementitious material. In this manner, a very uniform cellular structure is obtained and the cell size may be controlled merely by the amount of total additive which is used per cubic yard of concrete or by the speed of revolution of the mixing head beater or by both, the more additive used, the larger the cells are in size, and the slower the beater speed, the larger the size also. The "blowing" operation which produces the cells is the gas which is generated by release of the pressure when the material is discharged from the nozzle into the forms. A relatively small quantity of carbon dioxide and hydrogen are also produced by the chemical reactions which occur.

The setting of the finished concrete produce involves two steps: first, the setting of the cementitious material and water to produce concrete and the formation of the gas cells with the coating of paraffin or other film-forming material thereabout, and second the evaporation of the paraffin coating from the surface of the cells to yield a cellular concrete product, as shown in FIG. 6, which comprises an interconnected structure of the cementitious material and a multitude of the closed cells distributed throughout the structure.

The gas producing additive can be admixed with the cementitious slurry in a ratio of from about ½ gallon to about 2 gallon of the additive/cu. yd. of the finished product to produce a product having a density varying between 70 lbs./cu. ft. to 30 lbs./cu. ft.

Although it is obviously desirable to produce the cellular concrete only from the cementitious material, it is also possible to include various reinforcing materials, such as reinforcing steel, and fillers and extenders such as volcanic ash, expanded plastics, expanded mica, asbestos, and even the conventional sand and stone aggregate. Since the principal objective is the production of a concrete product having the necessary structural strength and a minimum of weight, it is preferred that filler and extender materials be omitted whenever possible.

The invention will be better understood by reference to the following specific but non-limiting example.

EXAMPLE

Using the process are system of apparatus illustrated in FIGS. 1–5 inclusive, approximately 21 gallons of water was pumped into mixer A, after which approximately 188 pounds of portland cement and 25 pounds of lime were introduced into mixer A. The water and cementitious materials were mixed for approximately 2 minutes, and the same operation was undertaken in mixer B. After the slurry had been mixed sufficiently in mixer A, it was transferred to the blender where it was further processed to produce a substantially uniform distribution of the cementitious material in the water.

The cementitious slurry was then pumped from the blender to a mixing block where it was admixed with the gas producing additive. The additive has been previously prepared by admixing approximately 39 volume percent of liquefied butane, approximately 40 percent of a 1:3 volume mixture of castor oil and No. 2 automotive diesel oil, approximately 12 volume percent paraffin, approximately 5 volume percent of carbon tetrachloride, and approximately 4 volume percent of oil soluble silicone. After a substantially saturated solution of the additive was produced, it was transferred to a receiver and maintained under pressure within such tank by butane gas. The additive was then transferred through the flow meter, and approximately ½ gallon of the additive was introduced into the mixing head along with approximately 36 gallons of the aforementioned cementitious slurry. The gas producing additive and cementitious slurry were admixed within the chamber of the mixing head to distribute evenly the additive in the slurry in a continuous flow, and the admixture was then transferred to a delivery nozzle and deposited into forms to produce a concrete product. The concrete remained in the form for approximately 24 hours to complete the inital set and two days for final curing or setting. At the end of this time, the forms were removed.

Tests were conducted on the cellular concrete product which indicated that the density was approximately 30 lbs./cu. ft., the compressive strength approximately 400 p.s.i. and the coefficient of conductivity approximately 0.08 B.t.u./ft.$^2$/ft./H/° F. The product was also tested for its thermal shock resistance which was found to be over 3500° F. rise in 1 second.

Although only a single illustrative example has been set forth, it will be appreciated that other such examples could be given using the various materials and ranges disclosed herein. Since further examples are not necessary for an understanding of the invention, however, none will be stated in the interest of brevity.

The concrete product of this invention is highly satisfactory for the production of road surfacing since the surface will always wear to the same type of surface and thus will have a uniform coefficient of friction throughout its life and be a non-skid surface. Also, because of the closed cell structure, the product will not absorb water, which is quite desirable in road construction. The cellular concrete also has other uses, including precast structures, such as blocks, steps, building facades, slabs, walls, partitions, baffles, etc. and as secondary insulation for ovens for the steel industry, for use in kilns, and in commercial refrigeration, both in structural parts and as insulation.

The cellular concrete of this invention is significantly less expensive to produce since the necessary structural strength can be obtained without the use of aggregate and with small quantities of cementitous material. Such product has also been found to have roughly ⅓ to ½ the weight of regular concrete, which is of significant importance, particularly in high rise construction. Even with such reduced weight, however, the concrete product will support 4½ times its own weight in slabs when designed on the skin stress principle whereas regular concrete will support only approximately 1½ times its weight in slabs. It has also been found that such material is a better insulator than Fiberglas and comparable to urethane foam.

Other modes of applying the principles of the invention may be employed, change being made as regards the details described, provided the features stated in any of the following claims or the equivalent of such be employed.

I, therefore, particularly point out and distinctly claim as my invention:

1. A process for the production of cellular concrete which comprises introducing a liquefied gas blowing agent which boils at ambient temperature and pressure into a water slurry of a water settable cementitious material, causing such liquefied gas blowing agent to boil to produce a multitude of closed gas cells in such material, forming a substantially impervious coating about such closed gas cells, and subsequently solidifying such cementitious material.

2. The process of claim 1 in which such cementitious material is portland cement.

3. The process of claim 1, in which such cementitious material is a mixture of portland cement and lime.

4. The process of claim 1 in which a gas producing additive is introduced into the slurry which consists essentially of approximately 20 to about 70 volume percent of a water insoluble, oil miscible liquefied gas blowing agent which boils at ambient temperature and pressure, approximately 4 to about 16 volume percent of a water insoluble, oil miscible film-forming agent, said film-forming agent being soluble in said blowing agent and capable of solidifying when such blowing agent boils forming a film about the closed gas cells produced by such blowing agent thereby preventing such closed gas cells from uniting with each other, and approximately 20 to about 50 volume percent of an oleaginous carrier liquid, said blowing agent and said film-forming agent being incapable of saponifying with the alkali content of such cementitious material.

5. The process of claim 4 in which the gas producing additive is introduced into such slurry under pressure to maintain such liquefied gas blowing agent in liquid condition, and such pressure is thereafter released to permit such liquefied gas blowing agent to boil and vaporize and form such multitude of closed gas cells.

6. The process of claim 4 in which such gas producing additive includes from about 2 to about 10 volume percent of an accelerator to accelerate setting of the same locally around the closed gas cells, such accelerator being incapable of saponifying with the alkali content of such cementitious material, and from about 2 to about 8 volume percent of an oil soluble stabilizer to make such additive water-repellent.

7. The process of claim 6 in which such accelerator is carbon tetrachloride which accelerates the setting of the cementitious material locally about such cells to preclude collapse and combining of cells during the setting of the cementitious material.

8. The process of claim 4 in which said blowing agent is liquefied butane, said film-forming agent is paraffin, and said carrier liquid is diesel oil.

9. The process of claim 4 in which such boiling of such liquefied gas blowing agent reduces the temperature of such additive causing such film-forming agent to solidify and form a thin film about such closed gas cells as aforesaid.

10. A composition for the production of cellular concrete consisting essentially of a water slurry of a water settable cementitious material, and a gas producing additive distributed substantially uniformly throughout such cementitious material, said additive consisting essentially of approximately 20 to about 70 percent of a water-insoluble, oil miscible liquefied gas blowing agent which boils at ambient temperature and pressure, approximately 4 to about 16 volume percent of a water insoluble, oil miscible film-forming agent, said film-forming agent being soluble in said blowing agent, and capable of solidifying when said blowing agent boils forming a film about the closed gas cells produced by said blowing agent thereby preventing said closed gas cells from uniting with each other, and approximately 20 to about 50 volume percent of an oleaginous carrier liquid, said blowing agent and said film-forming agent being incapable of saponifying with the alkali content of said cementitious material.

11. The composition of claim 10 in which said gas producing additive is in the form of droplets having a water film thereabout.

12. The composition of claim 10 in which said additive includes approximately 3 to about 10 volume percent of an accelerator to accelerate the setting of said cementitious material locally around said closed gas cells, said accelerator being incapable of saponifying with the alkali content of said cementitious material.

13. The composition of claim 10 in which said additive includes about 2 to about 8 volume percent of an oil soluble stabilizer to make said additive water-repellent.

14. The composition of claim 12 in which said slurry has a multitude of such closed gas cells therein formed by the boiling of said liquefied gas blowing agent as aforesaid, said closed gas cells having a film of said film-forming agent thereabout and encased within a film of hardened cementitious material.

15. The composition of claim 10 in which said cementitious material is selected from the group consisting of portland cement, lime, plaster, and mixtures of such materials.

16. The composition of claim 10 in which said cementitious material is portland cement.

17. The composition of claim 10 in which said cementitious material is a mixture of portland cement and lime.

18. The composition of claim 17 in which said blowing agent is liquefied butane, said film-forming agent is paraffin, said oleaginous carrier liquid is diesel oil and said accelerator is trichloroethylene.

19. The composition of claim 10 in which said film-forming agent is selected from the group consisting of paraffin, linseed oil, organic waxes, urethanes and film-forming plastic.

20. The composition of claim 10 in which said oleaginous carrier liquid is selected from the group consisting of diesel oil, castor oil, mineral oil, vegetable oil, and coconut oil.

21. The composition of claim 12 in which said accelerator producing agent is selected from the group consisting of carbon tetrachloride, trichloroethylene, chlorofluoro compounds, and sodium silicate.

22. The composition of claim 10 further including fire clay mixed with said cementitious material.

23. The composition of claim 10 further including asbestos clay mixed with said cementitious material.

24. The composition of claim 10 further including kaolin mixed with said cementitious material.

References Cited

UNITED STATES PATENTS

| | | | |
|---|---|---|---|
| 3,242,986 | 3/1966 | Hower | 106—90 |
| 3,150,988 | 9/1964 | Dess et al. | 106—87 |
| 3,145,774 | 8/1964 | Patchen | 106—90 |
| 2,917,384 | 12/1959 | Grandey | 106—86 |
| 3,030,258 | 4/1962 | Wagner | 106—90 |
| 2,915,301 | 12/1959 | Selden | 106—88 |
| 2,797,201 | 6/1957 | Veatch et al. | 106—86 |
| 2,232,588 | 2/1941 | Camp | 106—86 |
| 2,079,338 | 5/1937 | Roos | 106—88 |
| 1,829,381 | 10/1931 | Walter | 106—87 |

TOBIAS E. LEVOW, Primary Examiner

W. T. SCOTT, Assistant Examiner

U.S. Cl. X.R.

106—86, 90, 95, 96, 111, 122, 314, 315; 259—151